United States Patent
Cogley et al.

(10) Patent No.: US 12,307,200 B2
(45) Date of Patent: May 20, 2025

(54) MULTILINGUAL TEXT PROOFING

(71) Applicant: Microsoft Technoloy Licensing, LLC, Redmond, WA (US)

(72) Inventors: James Aidan Cogley, Dublin (IE); Alessandro Curzi, Bray (IE); Davide Turcato, Dublin (IE); Andrew Donohoe, Dublin (IE); Enrico Cadoni, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 17/977,973

(22) Filed: Oct. 31, 2022

(65) Prior Publication Data
US 2024/0169149 A1 May 23, 2024

(51) Int. Cl.
*G06F 40/232* (2020.01)
*G06F 40/253* (2020.01)
*G06F 40/263* (2020.01)

(52) U.S. Cl.
CPC .......... *G06F 40/232* (2020.01); *G06F 40/253* (2020.01); *G06F 40/263* (2020.01)

(58) Field of Classification Search
None
See application file for complete search history.

(56) References Cited

U.S. PATENT DOCUMENTS

| | | |
|---|---|---|
| 2009/0307584 A1 | 12/2009 | Davidson |
| 2016/0224540 A1* | 8/2016 | Stewart ............... G06F 40/232 |
| 2017/0357640 A1* | 12/2017 | Bellegarda ............ G06F 40/58 |
| 2020/0371686 A1 | 11/2020 | Alsharif |

OTHER PUBLICATIONS

Anonymous: "Typewise will have you rethinking your phone's standard keyboard", Mashable, Aug. 25, 2021, 19 pages, XP093106690, retrieved from the Internet: URL: https://mashable.com/review/typewise-smartphone-keyboard-review [retrieved on Nov. 28, 2023].
International Search Report and Written Opinion received for PCT Application No. PCT/US2023/032820, mailed on Dec. 8, 2023, 12 Pages.

* cited by examiner

*Primary Examiner* — Stella L. Woo
(74) *Attorney, Agent, or Firm* — Schwegman Lundberg & Woessner, P.A.

(57) ABSTRACT

A computer implemented method includes receiving text corresponding to a span of text. Language detection is performed on the received text to generate multiple language candidates. The received text is also proofed over multiple languages to generate multiple language proofing critiques. A most likely language is generated for the received text as a function of the language candidates and the multiple language proofing critiques.

18 Claims, 7 Drawing Sheets

MULTILINGUAL TEXT PROOFING

BACKGROUND

Multi language detection is key in a proofing service to provide a multilingual user a satisfactory writing experience. Some prior proofing services do not have language detection and require each incoming request to be tagged with a language in order to provide proofing. Without language autodetect, it is difficult to distinguish whether the tagged language differs from the language of the text or not. As a result, wrong critiques are generated, contributing to user dissatisfaction. Even with prior language autodetection, it may take a significant amount of time to recognize text input and start providing proofing critiques to the user.

SUMMARY

A computer implemented method includes receiving text corresponding to a span of text. Language detection is performed on the received text to generate multiple language candidates. The received text is also proofed over multiple languages to generate multiple language proofing critiques. A most likely language is generated for the received text as a function of the language candidates and the multiple language proofing critiques.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Multilingual users generate text in multiple different languages. To provide relevant proofing critiques, such as via spell checking functions provided by proofing services, language autodetect (LAD) functions may be used. Many language autodetect functions skew toward majority languages, such as English, French, Spanish, and others. This skew can lead to undetected minority languages, resulting in either no critique being provided, or inaccurate critiques being provided.

A misidentified language can lead to inaccurate critiques and a waste of computing resources used to generate the critiques.

The user may have more than one language enabled in a profile, and a client device being used by the user may not be able to quickly identify the language the user is typing in at the start of a sentence. Within a few words, spelling critiques for all languages are required for providing adequate service for a given service level agreement regarding spell checking and other language related services. The language should be detected quickly to reach the agreed upon service level. Once the language is identified, the client uses this information in subsequent calls to proofing services for the remainder of the sentence, and allows the provision of higher-level proofing, such as grammar calls.

Different applications may support different scopes of tagging text with a language identifier. Some may operate per character, word, page, document, or even by team. Many new apps or application, especially light weight apps, may not support the ability to include a tag with text that identifies the language a user has selected. Language autodetect functions may not have the precision required to quickly and accurately identify a language in time to support service level agreements. Disambiguating different dialects in a language can make identifying a language for text even more difficult.

An improved proofing system provides multilingual proofing in an proofing service for a user who may be writing in multiple different languages. Prior machine learning based language auto detection (LAD) methods do not perform well on shorter spans of text resulting in greater inaccuracy in providing proofing critiques. Such inaccuracy can increase user frustration.

The improved proofing system utilizes a merger of signals including both an output of an LAD and proofing service generated signals that include one or more of a number of critiques for received text to quickly determine a most likely language for the received text. The determination may also utilize the length of the received text and the user selected language set, to adapt the behavior of the proofing method to provide proofing in a sentence or other length of text, a span of text, with the proofing output contextualized on the certainty of the merged signals.

The improved proofing system can help improve a user's writing experience in a multi-lingual scenario by more quickly providing relevant proofing critiques. Users can seamlessly switch between languages while writing with the system quickly detecting the switch and providing relevant critiques. To facilitate such switching the process of determining the language may begin anew with each new sentence, paragraph, or other selected span of text.

Computing resource costs may also be reduced by making fewer calls to proofing services. More critiques are likely to be accepted as the critiques may be provided based on a highest ranking of the likely language being used for received text that is part of a span of text. Such ranking improves as more text is added to the span of text. The identification of a mostly likely language with a high certainty level can be locked in for a remaining span of text.

Locking in the mostly likely languages for a span of text makes the critiques more relevant and more efficient to provide as the critiques are only generated for the locked in language. Once the language is locked for a span of text, higher order critiques may be provided, such as autocorrect, grammar suggestions, and text prediction.

Figure 1:
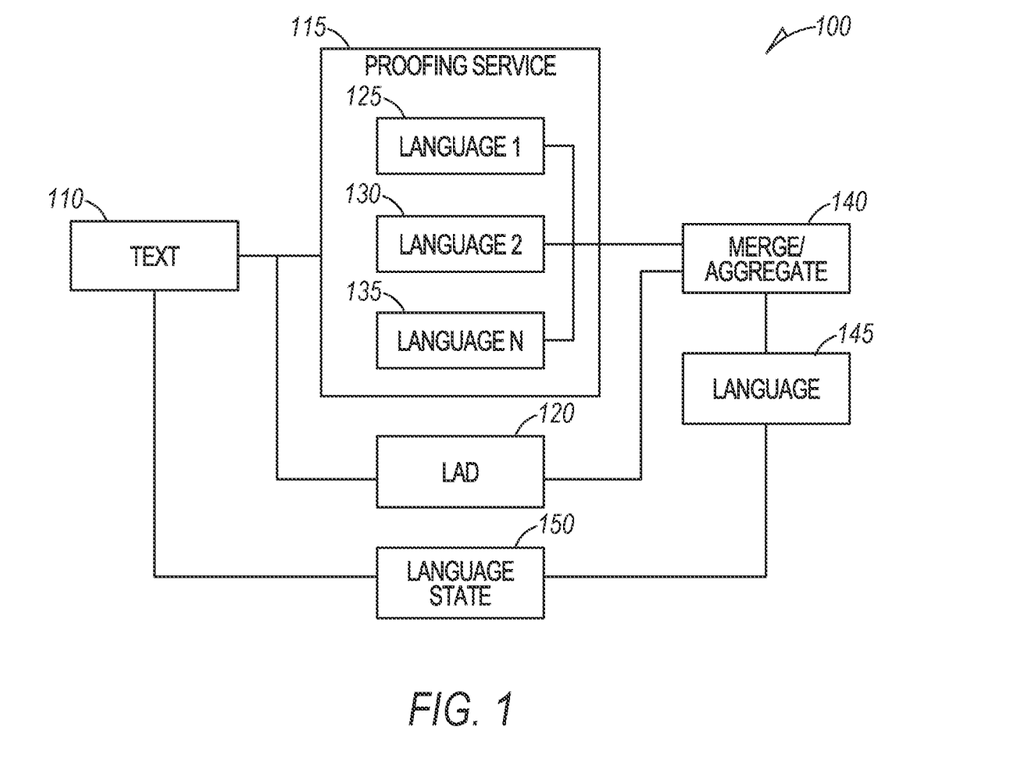
FIG. 1 is a block diagram of a system for providing language identification and proofing services according to an example embodiment.

FIG. 1 is a block diagram of a system 100 for providing language identification and proofing services. Text 110 may be received from a client device, also represented by text 110, and provided to both a proofer 115 and a language auto detection (LAD) service 120. Proofer 115 may be a local proofing service or a cloud based service in various examples. The text 110 may be M words of a span of text. A span of text may be a sentence or paragraph or some other segment of language logically understandable by humans being typed by a user on a client device. Text 110 may be received as part of a proofing call generated by the client device to obtain proofing services.

Where the language of the text is specified in the call, the proofer 115 may simply use a language proofer in the identified language, such as language proofer 1 at 125, which may be an English language proofer. If a language other than English is specified, language proofer 2 at 130 or any one of N different language proofers may be included in proofer 115 as indicated by language proofer N at 135.

In some cases, the proofing call, or other source of language identification, may not specify any language for the text 110 or may indicate that the user has more than one default languages selected, such as English, French, and Italian. If more than one default language is identified for the text 110, corresponding language proofers will process the text 110 to generate proofing critiques for each of the identified languages. If no default language is selected, each of multiple proofers in different languages may process the text to generate respective proofing critiques. The proofing critiques in one example at this stage of language identification includes spelling critiques using well know language proofing techniques.

Where the received text 110 is not associated with a single language, the text 110 is also provided to the LAD service 120. The LAD service 120 processes the text via one or more machine learning based models, such as deep neural networks, to generate language classifications with corresponding confidence levels. The classifications and proofing critiques are merged at an aggregator 140 to select a most likely language at 145. The most likely language is updated in a language state 150. A user may also set the language state 150.

In one example, the aggregator 140 compares the confidence levels for each language with a number of proofing critiques for each language for the text 110. If the language with the highest confidence is also the language with the least number of proofing critiques, that language is selected as the most likely language at 145. If no language meets that criteria, more text as part of the span is received and new proofing and classification is performed until the criteria is met.

The language state identifies the language for a span of text of which the received text 110 comprises M words. The span of text may be a unique ID for the span, with different spans of text having different IDs, referred to as TileIDs in one example. In various examples, M may vary between one word or one character, and 5 to 10 words or more. M may be varied to meet service level agreements relating to the provision of critiques. Lower values of M make language identification via the LAD service 120 less accurate, while larger values of M result in slower identification of language. As new additional text that is part of a span are provided, the classification becomes more accurate.

An additional factor relating to how quickly a most likely language is identified includes the similarity between two most likely candidate languages. Language candidates for text 110 that have a very low confidence can be removed from consideration. This removal can also be communicated to the proofing services for discontinuing proofing for removed languages for a span of text. However, similar languages may require more words in order to select a most likely language, and in fact, a most likely language will not be identified for the span of text. Critiques for the span will continue to be provided in both languages in one example until either a user selects the language, or if the user acts positively on the critiques for one language more than or to the exclusion of critiques in another, the one language will be selected.

A user interface may be generated that includes the critiques, and corresponding language for each critique, along with a checkbox or other user interface construct to allow selection of the language. In one example, the language state 150 comprises a cache storage device. The span ID is referred to as a Tile ID which may be a hashed key identifier for a span of text. The TileID and corresponding language ID are stored in the cache. A user may also set the language ID in the cache in one example.

Figure 2:
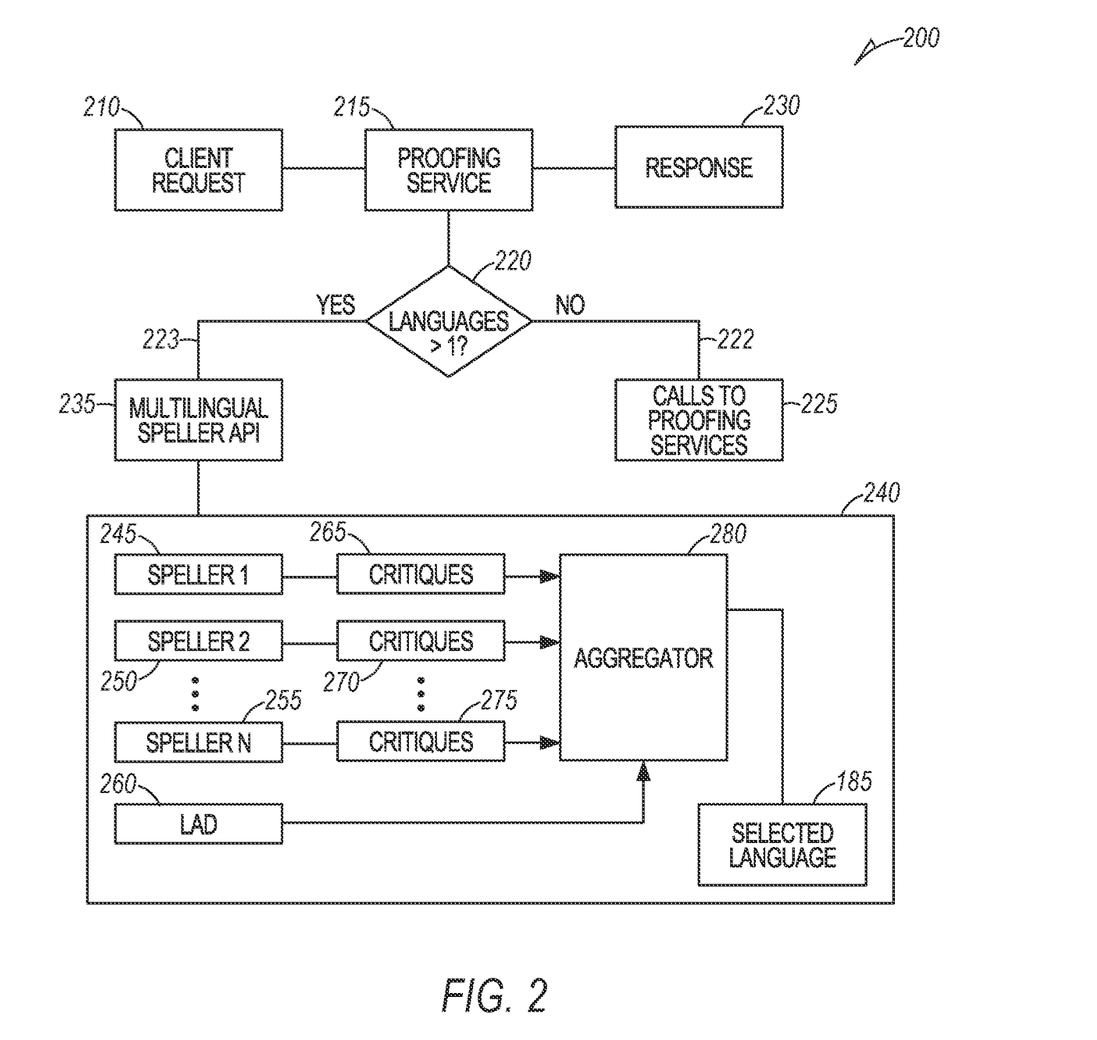
FIG. 2 is a block flow diagram illustrating a method of performing proofing and language identification functions for received text according to an example embodiment.

FIG. 2 is a block flow diagram illustrating a method 200 of performing proofing and language identification functions for received text. A client request is received at operation 210 from a client device. The client request in one example may by a call to proofing services 215 and take the form of:

```
{
"AutoSelect": true,
"Text": "The cat is",
"EnabledLangauges": ["en-us", "es-es"]
}
```

The above example request includes the text of: "The cat is" and also indicates that the request would like to be processed by the proofing service 215 using automatic selection of language for proofing. Also indicated in the request is that the two default languages have been selected with corresponding dialects, US English, and Spanish Spanish.

The request is forwarded to a proofing service 215, which first checks at decision operation 220 for the number of languages specified in the request, or if no language is specified or otherwise selected for the text in the request. If the number of languages is not greater than one, as indicated by a NO on line 222, proofing services for a single language associated with the request is called at 225, and normal proofing results are provided in a response 230 to the client. The response 230 may take the form of:

```
{
"SelectedLanguage": "en-us",
"Critiques": [<critique1>... <critiqueN>]
}
```

If more than one language is associated with the call and Autoselect is True, as indicated by YES on line 223, the text is provided via a multilingual speller application programming interface to a multilingual component 240 for processing via spellers 245, 250, 255 and language auto detection (LAD) 260. Spellers 245, 250, and 255 provide corresponding critiques 265, 270, 275 in the enabled languages. The critiques may be spelling critiques in one example. LAD 260 uses the text with a natural language model trained to recognize languages to classify the text according to language with corresponding confidence levels.

The critiques 265, 270, and 275 along with the classifications from LAD 260 are provided to an aggregator 280 for processing to select a language 285. The aggregator 280 may be configured to not select a language 285 if the text is less than a threshold number of characters, such as 10, 15, 20, or more, or a threshold number of words, such as 3 or more, or even in the case of a tie.

Text will continue to be received and added to the span of text until the threshold is passed. At that point, the aggregator may select the language as described above, with the language having the highest confidence and least number of critiques selected. In further examples, a language may be selected that have a confidence level above a selected confidence level threshold and critiques under a critique threshold number. The thresholds may be varied depending on language, length of text of the span, or other considerations to fine tune language selection. The fine tuning may even result in a language being selected with a lower confidence level than another language but having fewer critiques. Such a scenario is more likely with two languages that are very similar, or having different dialects, such as US English versus UK English.

In one example, critiques in most likely languages are provided via response 230 until a language is finally selected, upon which, response 230 will provide critiques only in the selected language.

Figure 3:
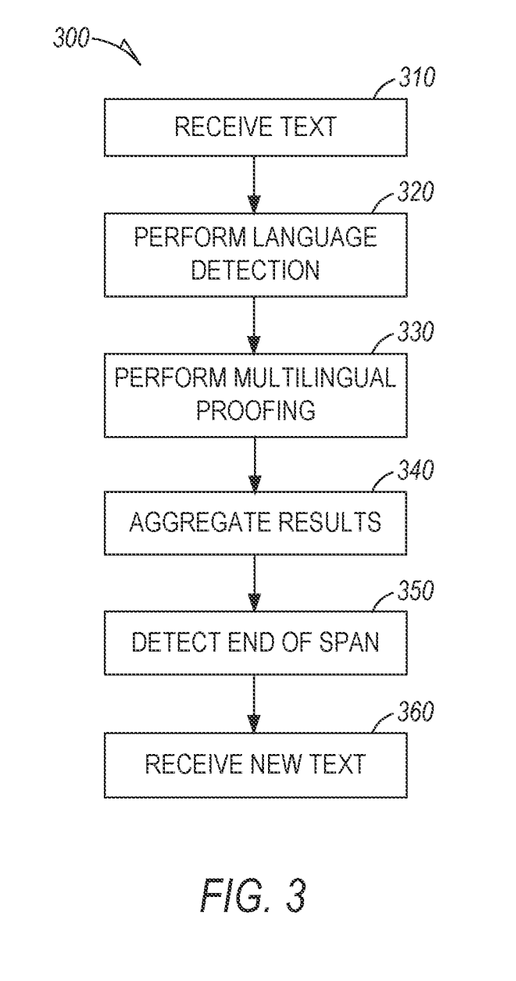
FIG. 3 is a flowchart of a computer implemented method for proving proofing of received text and identifying a language of the received text according to an example embodiment.

FIG. 3 is a flowchart of a computer implemented method 300 for proving proofing of received text and identifying a language of the received text. Method 300 begins at operation 310 by receiving text corresponding to a span of text. In one example, the received text comprises M words of the span of text, wherein the span of text comprises a sentence.

At operations 320, language detection is performed on the received text to generate multiple language candidates that include corresponding confidence levels. Operation 330 proofs the received text over multiple languages to generate multiple language proofing critiques. The proofing critiques comprise spelling critiques in one example.

The language candidates and the multiple language proofing critiques are used to identify a most likely language for the received text at operation 340. Languages having a higher number of spelling critiques may be excluded from the language candidates. Operation 340 may set a language state corresponding to the identified language for the span of text in a language cache. Additional text for the span of text may be received and processed to obtain enough text to have certainty in identifying the language for the span. Once the language is identified, additional proofing services on the received text selected from the group consisting of spelling autocorrect, grammar suggestions, and text prediction may be performed.

At operation 350, an end of the span of text may be detected. This may occur after the initial receipt of text and following receiving more text until the end of the span, such as a sentence is detected. Detection may be performed by observing a period followed by a space, or via natural language processing models trained to recognize various segments of text, such as sentences.

New text corresponding to a new span of text is received at operation 360. At this point, processing returns to operation 320 treating the new span of text as the span of text. Note that each span of text may have a unique ID that identifies the span of text and may have associated language tags. The treatment of a new span of text in the same manner as the originally received text allows a user to switch languages, which is beneficial for multilingual users.

In one example, multiple language proofing critiques for the received text may be provided for display prior to identifying the most likely language. Once the language is selected and set, proofing critiques may be limited to the most likely language. In one example, along with the providing the multiple language proofing critiques for the received text for display, the user is provided with an option to indicate a selected language.

Figure 4:
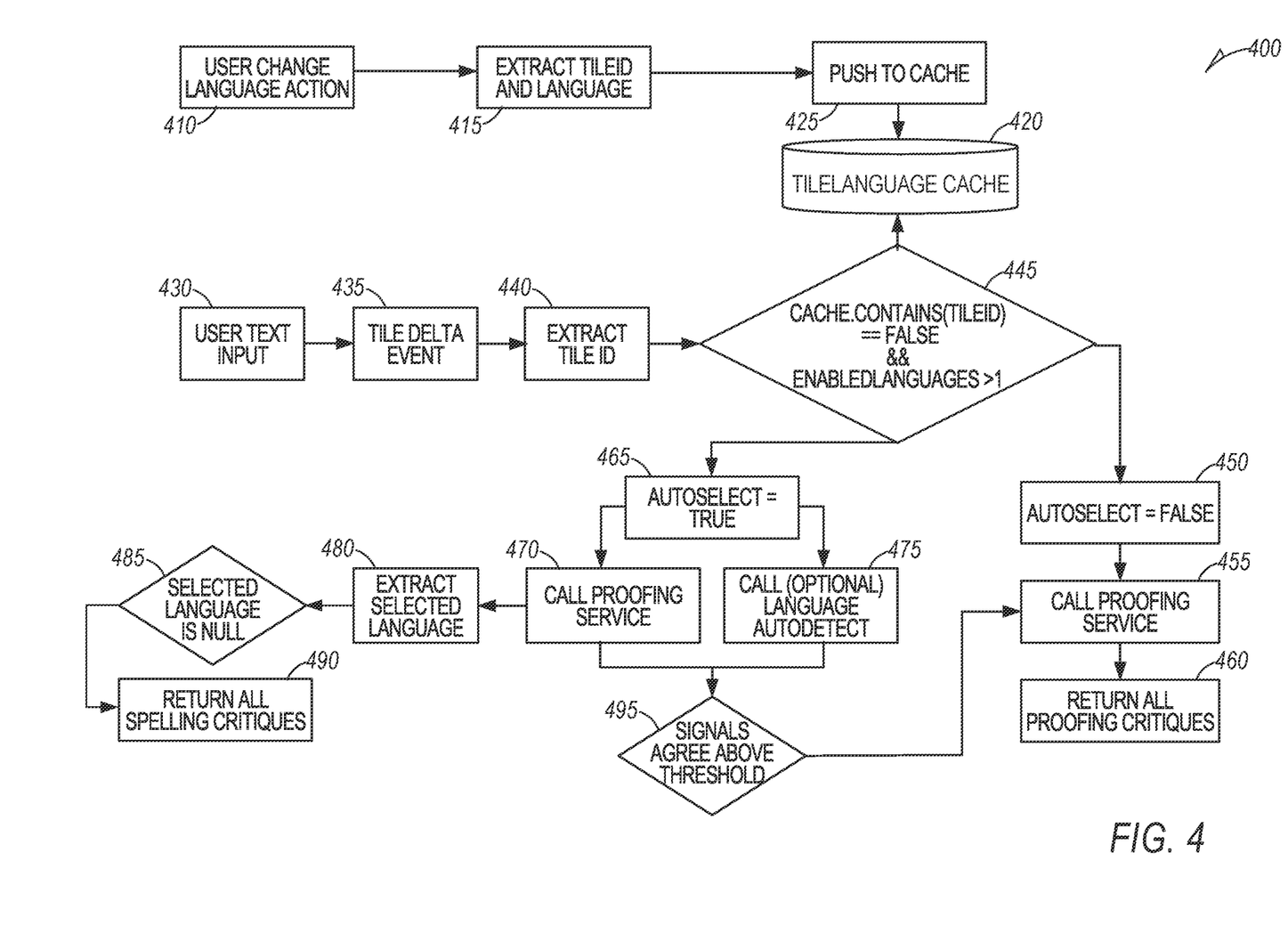
FIG. 4 is a detailed flowchart of a computer implemented method for processing text received from a user client device according to an example embodiment.

FIG. 4 is a detailed flowchart of a computer implemented method 400 for processing text received from a user client device. In FIG. 4, a span of text is indicated as a tile. Each different span of text has a corresponding unique text span identifier, referred to as a Tileid. Method 400 includes the ability of a user to select a user change language action at operation 410 which results in in operation 415 extracting a Tileid and corresponding language or languages selected by the user as user enabled languages for a span of text. The extracted user enabled Tileid and corresponding language is pushed to a language cache 420 at operation 425.

At operation 430, user input text is received. The text is at least part of a span of text, and may be an initial part of a new span or a new part of an existing span of text. At operation 435, the received text is identified and extracted at operation 440. At decision operation 445, a check is made with the language cache 420 to determine if the language cache 420 contains a TileID for the span of text and if more than one language has been enabled for the TileID. If the language cache 420 contains a file ID and the number of enabled languages is not greater than one, autoselect is set to false at operation 450, and a call to a proofing service is made at operation 455. At operation 460, proofing critiques are provided in response to the user text input.

If at decision operation 445, the language cache 420 contains a TileID and the number of enabled languages is greater than one, autoselect is set to true at operation 465 and calls are made to a proofing service at operation 470 and language autodetect at operation 475. At operation 480, spelling critiques for the multiple languages is extracted along with identifiers of the languages. If the selected language is not null at decision operation 485, all spelling critiques are returned to the user. If null, and if at decision operation 495, which receives proofing and language identification signals from operations 470 and 475, it is determined that the signals are above a threshold, the language of the span has been successfully identified and proofing services are performed using the identified language at 455, and the selected language is pushed at operation 425 to the language cache 420.

Figure 5:
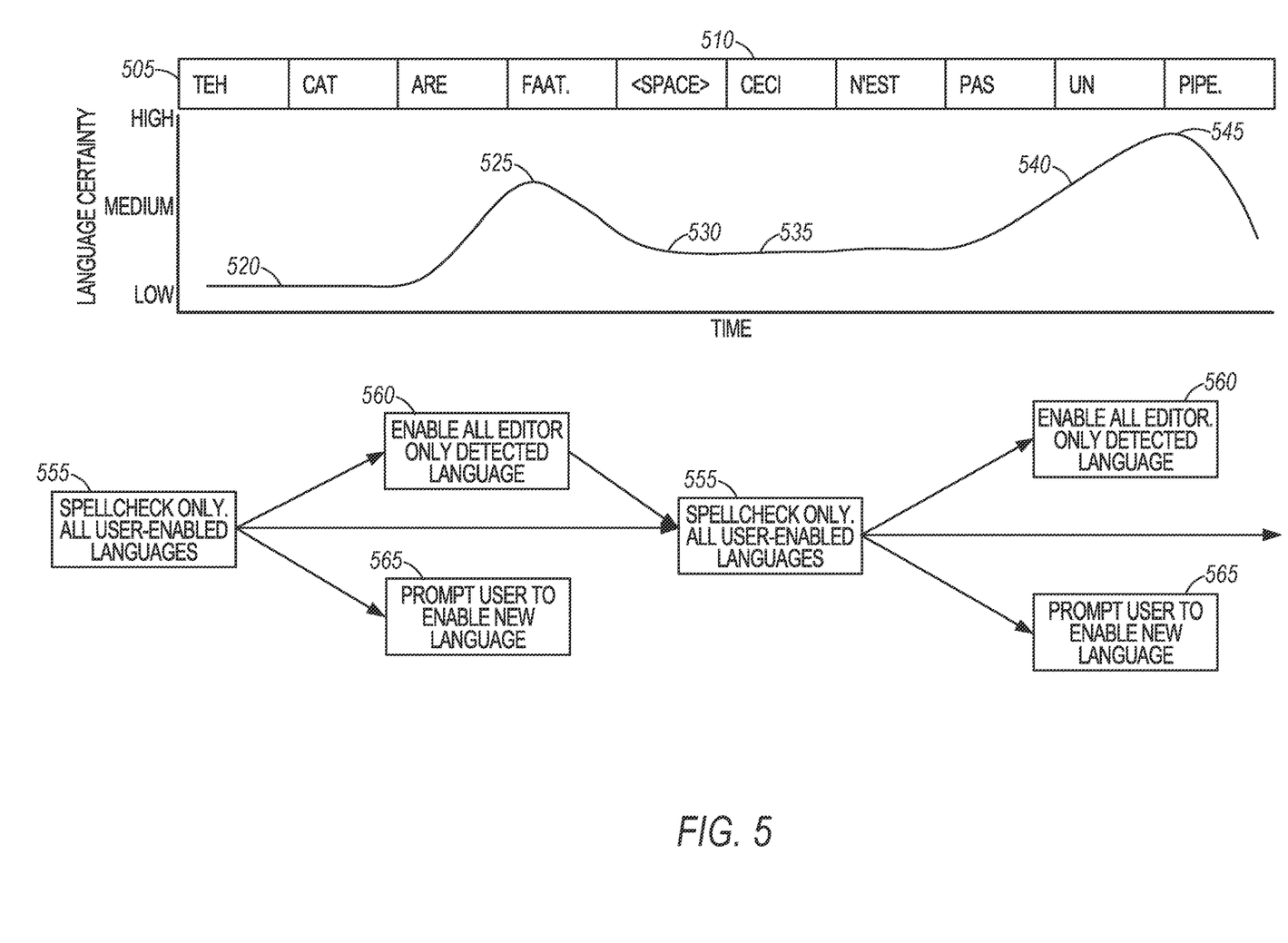
FIG. 5 is a diagram illustrating one example of continuous language detection according to an example embodiment.

FIG. 5 is a diagram illustrating one example, option 1, of continuous language detection generally at 500. Two text spans are indicated at 510 "Teh cat are faat." and 515 "Ceci n'est pas un pipe." The first text span 510 is in English, and the second text span is in French. Certainty along a vertical axis 515 is reflected by a line 520 as the text is processed for detection. Spellcheck only is performed at 555 across all user enabled languages as words in the first text span 510 are processed. The certainty is increasing by the third word and peaks with the last word as indicated at 525.

If the language is detected along the span with the high confidence, either before or at the end of the span, and is one of the enabled subset of languages, a proofing service may be enabled at 560 only for the detected language and the provision of more advanced proofing services. If the language is not one of the enabled languages, the user may also be prompted at 565 to enable the language, which also enables providing of the more advanced proofing services in that language. If the language has not been detected at a point along the span with high certainty, spellcheck critiques for all the languages are provided to the user, consuming significant computing resources. In one examples, languages associated with confidences below a certain level may have their critiques suppressed from being provided to the user. Note that once the advanced proofing services are enabled for a span, the entire span is proofed.

At 530, a period and a space have been detected, indicating that span 505 has ended and starting the process over with new second span 510. Confidence is low at 535 and climbs by the fourth word at 540 and peaks by the last word at 545. The same processing occurs for the second span.

Figure 6:
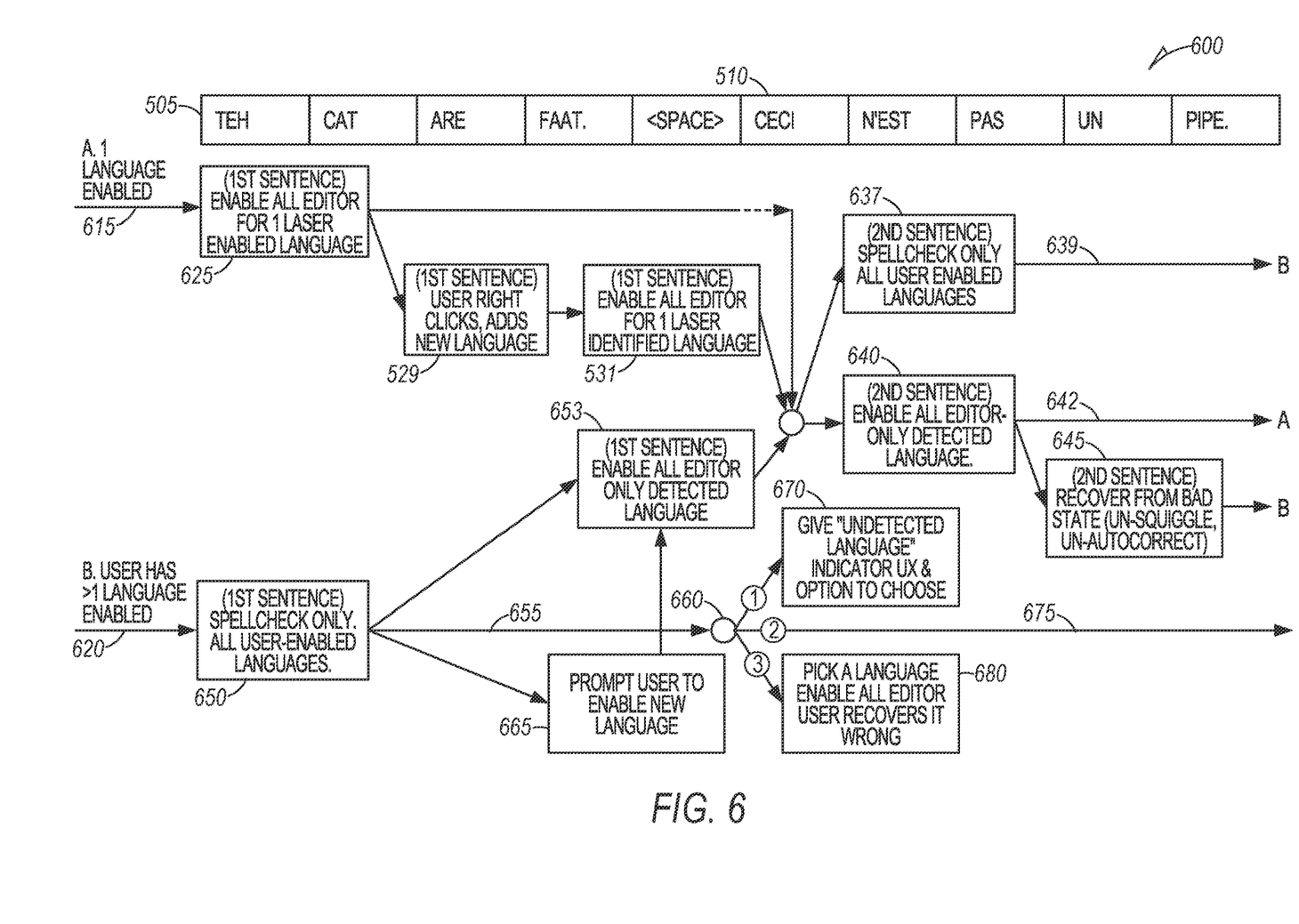
FIG. 6 is a diagram illustrating a further example of continuous language detection generally according to an example embodiment.

FIG. 6 is a diagram illustrating an example, option 2, of continuous language detection generally at 600. The same two text spans are indicated at 505 and 510 boxes. The first text span 505 is in English, and the second text span 510 is in French. Two sub options are shown at 615 and 620 that are loosely aligned with the text spans 505 and 510. Sub option 615 is performed in response to the user having one enabled language. Sub option 620 is performed in response to the user having more than one enabled language.

In sub option 615, where only one language is enabled, for the English text span 505, all proofing functions are enabled at 625 for the entire text span 505 as indicated at path 627, which ends in a period and space as indicated at 630. Path 626 may be the most common path for users that type in only one language.

Sub option 615 varies in response to detection of a user typing in a different language. This may be evidenced by the text containing various squiggles (underlining representing a critique), autocorrections, and predictions, as the wrong language proofing is being applied. The user may select a new language as indicated at 629, which is followed by the enablement of proofing services for the new language for the text span 505 which is used until the end of the span at 635.

At 635, a new sentence or text span 510 starts. The language may reset to an unknown state at this time. In one path, at 637, spellcheck only is performed for all user enabled languages and processing proceeds along a path in sub option 620. Language detection is also run.

In a further example path, at 640, proofing is performed for the single enabled or detected language. If the language has changed, bad autocorrections and grammar flags may ensue along path 642. Alternatively, at 640, the language detection confidence drops to uncertain, and corrections displayed for the sentence are undone at 645. Processing then proceeds to sub option 620.

Sub-option 620 applies where a user has enabled more than one language. At 650, proofing includes only spell checking to generate critiques for all the user-enabled languages. If a language is detected with high confidence before or at the end of the sentence, all proofing functions are enabled for that language as indicated at 653 until the end of the span at 635.

At 655, if a language is never detected with high confidence, the path proceeds to 660, which includes three divergent paths. A first path includes providing at 670 an undetected language indicator to a user interface along with an option to select a language. A second path 675 includes remaining in the flow and continuing to just run spell check. A warning to the user may also be provided along the second path. A third path 680 may involve just selecting a most likely language even though the confidence is not sufficient in most circumstances. This is an unlikely path that may result in a user having to ignore all critiques.

In one example following spell checking all user enabled languages at 650, a language may be detected with a high confidence before or at the end of a sentence where the language is not one of the enabled languages. At 665 a user is prompted to enable a new language, and if done, processing follows the path at 653 to enable all proofing functions for the selected language.

Example outcomes of processing text using the editing and language identification functions and assuming one of the enabled languages are now described with respect to the language that has been selected for the two text spans. A first example based on English being enabled, until leaned differently is:

| | cat | are | faat. | <space> | Ceci | n'est | pas | un | pipe. |
|---|---|---|---|---|---|---|---|---|---|

The first word has red dots or squiggles indicating that "Teh" has been autocorrected to "The". "are" has double underlining in blue indicating a grammar error. "faat" is underlined with dots indicating a spelling critique. This is a good experience for the span written in English. The second span of text is in French, and every word is underlined. Based on all the critiques and an LAD prediction of French with higher confidence, the user can be prompted to enable French.

A second example based on English and French being enabled results in a much better experience:

| | cat | are | faat. | <space> | Ceci | n'est | pas | un | pipe. |
|---|---|---|---|---|---|---|---|---|---|

Here, the first span of English text has the same critiques and autocorrected spelling. The second span of French text now has only one grammar correction corresponding to "un". The spans are both handled well by the editing and language identification service.

A third example based on English and Italian being enabled results in bad autocorrects and bad grammar flags:

| | cat | are | faat. | <space> | Ceci | n'est | pas | un | pipe. |
|---|---|---|---|---|---|---|---|---|---|

There are speller squiggles on the second span of French text and a higher chance of missed flags, as some French words are also in the Italian lexicon. The second span may result in the user being prompted to enable French.

The above examples may result in varying user experience when the proofing is deferred until the language for a span has been determined. No squiggles will appear until four words are typed for the first span. This results in no false flags and no need to undo undesired autocorrects. The user may question whether or not the proofing service is working given the latency between entering text and obtaining critiques. It provides a cleaner experience and allows prompting of the user to enable a new language when a switch in language is detected. In the second example with English and French being enabled, the same latency, and there is a low risk of missed flags due to a misspelling being valid in an enabled language. In example three, the same high latency may occur with no false flags and no need to under undesired autocorrects. The user experience is clean and the user can be prompted to enable new languages when a language switch is detected.

The above examples may result in a different user experience in response to enabling spelling error detection for all enabled languages, but deferring the rest of the proofing functions until the language has been determined. For the first English enabled example, autocorrect and grammar are delayed. Squiggle appear immediately on French text, and an offer is made to enable French once four words of the second text span are received. Once the language is determined with high confidence, text spans are rechecked with the proofing service. For the second English and French enabled example, there is some risk of missed flags due to spelling being valid in another language. There is also a higher cost of processing resources, as spellchecking is performed in multiple languages for each span until a language is detected. The same occurs for the third English and Italian example.

Figure 7:
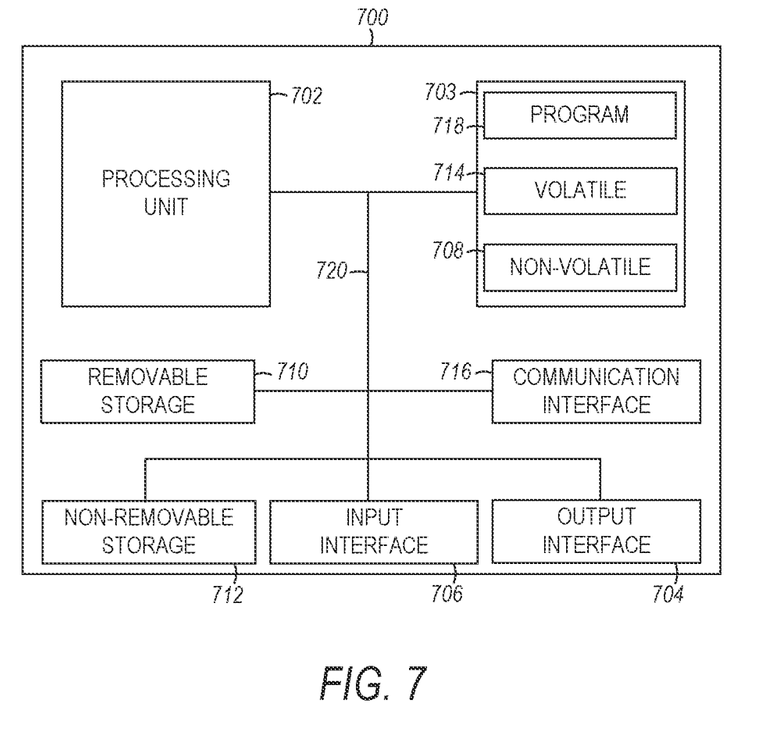
FIG. 7 is a block schematic diagram of a computer system to implement one or more example embodiments.

FIG. 7 is a block schematic diagram of a computer system 700 to implement one or more of a client device and components for the improved proofing system including LAD and proofing functions and for performing methods and algorithms according to example embodiments. All components need not be used in various embodiments.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, smart storage device (SSD), or other computing device including the same or similar elements as illustrated and described with regard to FIG. 7. Devices, such as smartphones, tablets, and smartwatches, are generally collectively referred to as mobile devices or user equipment.

Although the various data storage elements are illustrated as part of the computer 700, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touchscreen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 718 along with the workspace manager 722 may be used to cause processing unit 702 to perform one or more methods or algorithms described herein.

EXAMPLES

1. A computer implemented method includes receiving text corresponding to a span of text. Language detection is performed on the received text to generate multiple language candidates. The received text is also proofed over multiple languages to generate multiple language proofing critiques. A most likely language is generated for the received text as a function of the language candidates and the multiple language proofing critiques.

2. The method of example 1 wherein the language candidates include confidence levels.

3. The method of any of examples 1-2 wherein the multiple languages include languages enabled by a user that generated the received text.

4. The method of any of examples 1-3 wherein the proofing critiques comprise spelling critiques.

5. The method of any of examples 1~4 wherein languages having a higher number of spelling critiques are excluded from the language candidates.

6. The method of any of examples 1-5 wherein the received text comprises M words of the span of text, wherein the span of text comprises a sentence.

7. The method of any of examples 1-6 and further including detecting an end of the span of text, receiving new text corresponding to a new span of text, performing language detection on the received new text to generate multiple language candidates, proofing the received new text over multiple languages to generate multiple language proofing critiques, and identifying a most likely language for the received new text as a function of the language candidates and the multiple language proofing critiques.

8. The method of any of examples 1-7 and further including setting a language state corresponding to the identified language.

9. The method of example 8 and further including performing grammar proofing on the received text in the identified language in response to setting the language state.

10. The method of any of examples 8-9 and further including in response to setting the language state, performing additional proofing services on the received text selected from the group consisting of spelling autocorrect, grammar suggestions, and text prediction.

11. The method of example 10 and further including receiving additional text corresponding to the span of text and performing proofing of the span of text including the additional text.

12. The method of any of examples 1-11 and further including providing the multiple language proofing critiques for the received text for display prior to identifying the most likely language and providing the proofing critiques for the most likely language for display after identifying the most likely language.

13. The method of any of examples 1-12 and further comprising providing an option, along with the providing the multiple language proofing critiques for the received text for display, for a user to indicate a selected language.

14. The method of any of examples 1-13 and further comprising providing the proofing critiques for multiple languages to a client system from which the span of text was received.

15. A machine-readable storage device has instructions for execution by a processor of a machine to cause the processor to perform operations to perform a method. The operations include receiving text corresponding to a span of text, performing language detection on the received text to generate multiple language candidates, proofing the received text over multiple languages to generate multiple language proofing critiques, and identifying a most likely language for the received text as a function of the language candidates and the multiple language proofing critiques.

16. The device of example 15 wherein the language candidates include confidence levels and wherein the proofing critiques comprise spelling critiques.

17. The device of any of examples 15-16 wherein the operations further include detecting an end of the span of text, receiving new text corresponding to a new span of text, performing language detection on the received new text to generate multiple language candidates, proofing the received new text over multiple languages to generate multiple language proofing critiques, and identifying a most likely language for the received new text as a function of the language candidates and the multiple language proofing critiques.

18. The device of any of examples 15-17 wherein the operation further include setting a language state corresponding to the identified language and performing additional proofing services on the received text selected from the group consisting of spelling autocorrect, grammar suggestions, and text prediction.

19. The device of any of examples 15-17 wherein the operations further include providing the multiple language proofing critiques for the received text for display prior to identifying the most likely language and providing the proofing critiques for the most likely language for display after identifying the most likely language.

20. A device includes a processor and a memory device coupled to the processor and having a program stored thereon for execution by the processor to perform operations. The operations include receiving text corresponding to a span of text, performing language detection on the received text to generate multiple language candidates, proofing the received text over multiple languages to generate multiple language proofing critiques, and identifying a most likely language for the received text as a function of the language candidates and the multiple language proofing critiques.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
   receiving text corresponding to a span of text;
   performing language detection on the received text to generate multiple language candidates;
   proofing the received text over multiple languages to generate multiple language spelling critiques;
   identifying and locking a most likely language for the received text as a function of the language candidates and the multiple language spelling critiques; and
   proofing the received text over the locked most likely language to provide additional proofing services including grammar suggestions.

2. The method of claim 1 wherein language detection is performed via a language autodetect service processing one or more machine learning based models, wherein the language candidates include confidence levels, and wherein identifying a most likely language for the received text is performed by an aggregator as a function of the confidence levels and a number of spelling critiques generated for each language candidate.

3. The method of claim 2 wherein the multiple languages include languages enabled by a user that generated the received text, and wherein the one or more machine learning based models comprise models trained in the languages enabled by the user.

4. The method of claim 3 wherein the spelling critiques are obtained via a call to proofing services and wherein the additional proofing services include at least one of text prediction or grammar suggestions.

5. The method of claim 1 wherein languages having a higher number of spelling critiques are excluded from the language candidates.

6. The method of claim 1 wherein the received text comprises M words of the span of text, wherein the span of text comprises a sentence.

7. The method of claim 1 and further comprising:
   detecting an end of the span of text;
   receiving new text corresponding to a new span of text;
   performing language detection on the received new text to generate multiple language candidates;
   proofing the received new text over multiple languages to generate multiple language spelling critiques; and
   identifying a most likely language for the received new text as a function of the language candidates and the multiple language spelling critiques.

8. The method of claim 1 and further comprising setting a language state corresponding to the locked most likely language.

9. The method of claim 8 wherein the additional proofing services include at least one of spelling autocorrect, grammar suggestions, or text prediction.

10. The method of claim 1 and further comprising:
    receiving additional text corresponding to the span of text; and
    performing proofing of the span of text including the additional text.

11. The method of claim 1 and further comprising:
    providing the multiple language spelling critiques for the received text for display prior to identifying the most likely language; and
    providing the spelling critiques and grammar suggestions for the most likely language for display after identifying the most likely language.

12. The method of claim 1 and further comprising providing an option, along with the providing the multiple language spelling critiques for the received text for display, for a user to indicate a selected language.

13. The method of claim 1 and further comprising providing the spelling critiques for multiple languages to a client system from which the span of text was received.

14. A non-transitory machine-readable storage device having instructions for execution by a processor of a machine to cause the processor to perform operations to perform a method, the operations comprising:
    receiving text corresponding to a span of text;
    performing language detection on the received text to generate multiple language candidates;
    proofing the received text over multiple languages to generate multiple language spelling critiques;
    identifying and locking a most likely language for the received text as a function of the language candidates and the multiple language spelling critiques; and
    proofing the received text over the locked most likely language to provide additional proofing services including grammar suggestions.

15. The device of claim 14 wherein language detection is performed via a language autodetect service processing one or more machine learning based models, wherein the language candidates include confidence levels, and wherein identifying a most likely language for the received text is performed by an aggregator as a function of the confidence levels and a number of spelling critiques generated for each language candidate.

16. The device of claim 14 wherein the operations further comprise:
    detecting an end of the span of text;
    receiving new text corresponding to a new span of text;
    performing language detection on the received new text to generate multiple language candidates;
    proofing the received new text over multiple languages to generate multiple language spelling critiques; and
    identifying a most likely language for the received new text as a function of the language candidates and the multiple language spelling critiques.

17. The device of claim 14 wherein the operations further comprise:
    providing the multiple language spelling critiques for the received text for display prior to identifying the most likely language; and
    providing the spelling critiques and grammar suggestions for the most likely language for display after identifying the most likely language.

18. A device comprising:
    a processor; and
    a memory device coupled to the processor and having a program stored thereon for execution by the processor to perform operations comprising:
    receiving text corresponding to a span of text;
    performing language detection on the received text to generate multiple language candidates;

proofing the received text over multiple languages to generate multiple language spelling critiques
identifying and locking a most likely language for the received text as a function of the language candidates and the multiple language spelling critiques; and
proofing the received text over the locked most likely language to provide additional proofing services including grammar suggestions.

* * * * *